(No Model.)
B. P. WALLACE.
TRAP.
No. 547,826.        Patented Oct. 15, 1895.
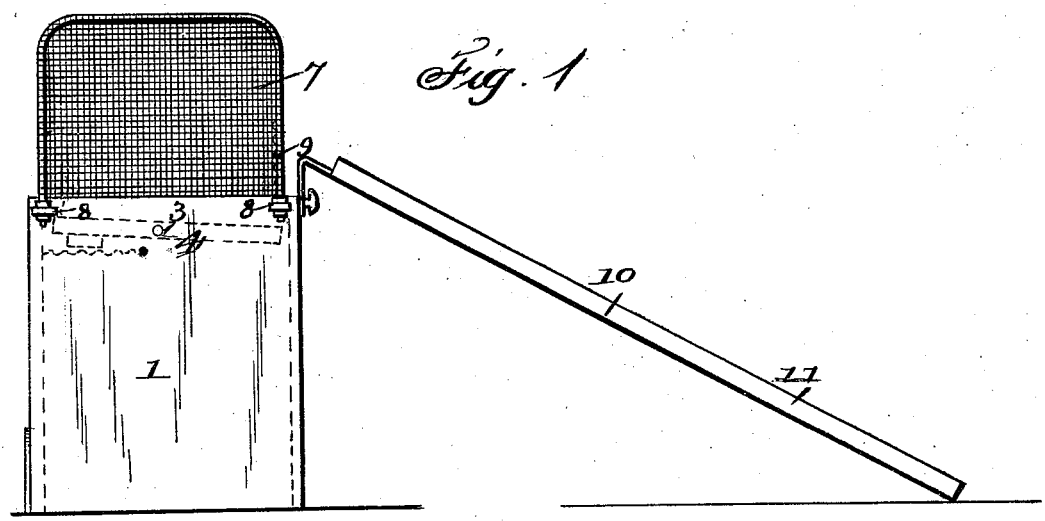
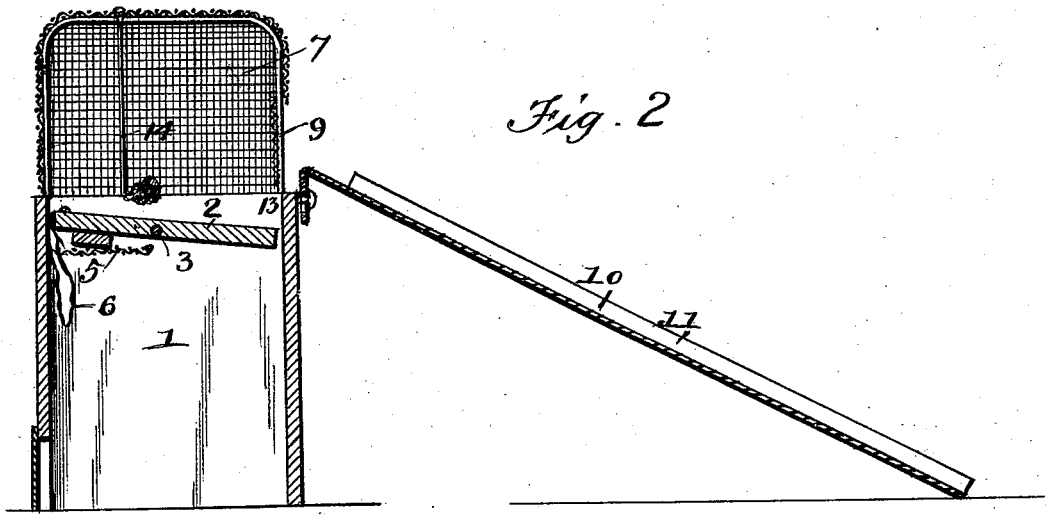
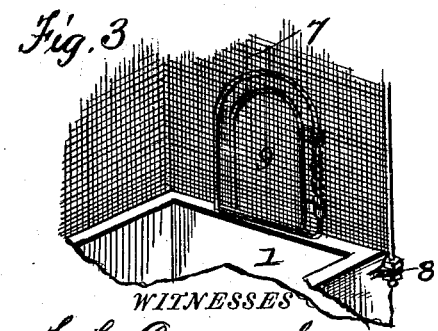
WITNESSES
INVENTOR
Bar P. Wallace,
By H. B. Willson
Attorney

UNITED STATES PATENT OFFICE.

BAR P. WALLACE, OF DALLAS, TEXAS, ASSIGNOR OF ONE-THIRD TO JOSEPH P. GERNMUILLER, OF SAME PLACE.

TRAP.

SPECIFICATION forming part of Letters Patent No. 547,826, dated October 15, 1895.

Application filed July 6, 1895. Serial No. 555,118. (No model.)

*To all whom it may concern:*

Be it known that I, BAR P. WALLACE, a citizen of the United States, residing at Dallas, in the county of Dallas and State of Texas, have invented certain new and useful Improvements in Traps; and I do declare the following to be a full, clear, and exact description of the invention, such as will enable others skilled in the art to which it appertains to make and use the same.

My invention relates to traps, and has particular reference to that class of traps employed for capturing fish, fowls, rodents, and animals.

The object of my invention is to provide a trap which shall be of such construction as to effectively prevent the escape of the captives, and to provide a trap which shall be simple, durable, and comparatively inexpensive of production.

With these objects in view the invention consists of certain features of construction and combination of parts, which will be hereinafter fully described and claimed.

In the accompanying drawings, Figure 1 is a side elevation of the trap as constructed to be used for the capture of animals, fowls, and rodents. Fig. 2 is a longitudinal vertical sectional view of the same. Fig. 3 is a detail perspective of the cage, showing more fully the attachment of the same to the fly-door.

1 denotes the casing or receptacle of the trap, which may be of any suitable form and construction and which is shown in the present instance as consisting of a rectangular box. A door is formed in the rear end of the casing near the bottom for the purpose of removing the captives, and the upper end of the casing is open. A platform 2 is pivoted by trunions 3 in apertures 4 of the casing, and has a weight at its rear end to cause the door to return to its normal position after an animal has been captured. Covering one-half of the opening in the top, preferably at that half toward the rear of the casing, is a partition 5, preferably made of wire-gauze.

6 denotes a check-cord, which is to prevent the weighted end of the platform being thrown over the front part of the casing when the animal steps on the front end of the platform. This cord is secured to the rear end of the platform and to the rear of the casing. A cage 7 is supported upon laterally-extending lugs 8, projecting from the sides of the casing, and has an inwardly-swinging fly-door 9, which may be formed of network, as shown. An inclined way 10, which is preferably constructed of sheet metal and provided with side flanges 11, has its upper end bent downward to form a bracket and is provided with apertures, so that it may be supported upon pins 12, projecting from the front side of the casing. The upper end of this way is arranged a distance above the top of the trap, as shown at 13, for a purpose presently to appear.

14 denotes a bait-hook, which may be supported at any suitable point at the rear of the trunnions of the swinging platform. In the present instance it is shown supported from the top of the cage.

In operation the animal, fowl, or rodent will ascend the way, and when it is at the top will see the bait hung within. The animal will now push its way through the door to secure the bait, and in doing this its body will be thrown forward and downward, owing to the raised portion of the way at its upper end, thus causing the animal to be precipitated into the casing, from whence it will be prevented escaping, should it attempt to jump upward against the swinging platform, by the partition in the top of the casing at the rear thereof. Should, however, the animal in passing through the door in the cage spring upon that portion of the platform at the rear of the trunions and get the bait, it will be prevented escaping upon its return, as it will walk upon the forward end of the platform, which will tilt and drop the animal into the casing. The animal would be prevented from jumping from the rear portion of the casing out through the fly-door, for the reason that said door is constructed to swing only inward. If the animal should attempt to leap from the rear end of the swinging platform through this door by reason of the failure of the door to swing outward, it would strike the door and fall upon the forward end of the platform and then drop into the casing.

Having thus described my invention, what I claim, and desire to secure by Letters Patent, is—

In an animal trap, the combination with a receptacle, having a hinged platform provided with a weighted rear end, a cage supported upon lugs projecting from the sides of said receptacle, and provided with a spring-actuated inwardly opening door or gate, and an inclined way leading to said door, the upper end of said way being arranged to project above the top of the casing, substantially as set forth.

In testimony whereof I affix my signature in presence of two witnesses.

BAR P. WALLACE.

Witnesses:
R. HERZOG,
A. B. SUIT.